United States Patent Office 3,198,601
Patented Aug. 3, 1965

3,198,601
PROCESS FOR PRODUCING POTASSIUM SULFATE STARTING FROM KAINITE
Giacinto Veronica and Michele Maggiore, Novara, Italy, assignors to Montecatini, Società Generale per l'Industria Mineraria e Chimica, Milan, Italy, an Italian corporation
No Drawing. Filed Sept. 13, 1961, Ser. No. 137,752
Claims priority, application Italy, Sept. 15, 1960, 15,970/60
3 Claims. (Cl. 23—121)

Our invention relates to, and has as an object thereof, a process for producing potassium sulfate from kainite, which may contain NaCl as an impurity, with high yields, by leaching operations.

According to a known process, the production of potassium sulfate from kainite ($KCl \cdot MgSO_4 \cdot 3H_2O$) occurs through two main operations, i.e.:

(a) Conversion of kainite to schoenite $$(K_2SO_4 \cdot MgSO_4 \cdot 6H_2O)$$

by means of the sulfuric acid mother liquor obtained in operation (b), the optimum temperature being about 25° C.; and (b) Leaching the schoenite produced in (a) with water, to produce $K_2SO_4$ as a crystal phase, and an equilibrium solution which is called sulfate mother liquor (SML) which contains the entire $MgSO_4$ content and a portion of the $K_2SO_4$ content present in the starting double sulfate; the optimum temperature being 48° C. The SML is employed to convert the kainite to schoenite, according to point (a).

The equilibrium solution resulting from said transformation (conversion), which is not furthermore usable, constitutes the so-called final mother liquor of the process (FML), and the potassium content thereof, referred to the kainite potassium, represents the process loss.

If it is desired to employ a closed cycle between steps (a) and (b), the quantity and composition of the schoenite produced must be kept constant, in order to obtain a constant amount of recycle SML, the assumption being made that the composition of the kainite feed is maintained constant. However, the amount of SML necessary to satisfy the above condition of cycle processing is always in excess of that which is strictly necessary in order to convert the corresponding cyclic amount of kainite.

For instance, with a kainite containing 17% $K_2O$, the quantitative equilibrium conditions between steps (a) and (b) are:

Kainite feed _____ kg__ 100
Recycle SML (at 48° C.) _____ m.³__ 155
Produced 21% schoenite _____ kg__ 125

This quantity of schoenite, when treated with water at 48° C., produces 155 m.³ SML, which is recycled; however, said 155 m.³ could convert, practically within the same reaction time, much larger amounts of kainite, e.g. 155 kg.

It is apparent in these cases that a larger amount of schoenite is obtained, whereof only an aliquot part may be leached to sulfate, whereas the balance must be diversely employed. Correspondingly, the transformation yield of the kainite $K_2O$ increases, however the transformation ratio:

$$\frac{\text{sulfate } K_2O}{\text{schoenite } K_2O}$$

decreases, i.e. with the gradual increase of the overall yield of the $K_2O$ produced, which yield shifts toward the schoenite form, to the prejudice of the more valuable $K_2SO_4$ form.

All of said considerations may be perfectly verified theoretically on the equilibria diagram of even pairs of salts:

$K_2Cl_2 + MgSO_4 \rightarrow K_2SO_4 + MgCl_2$ (see Kali-Forschungsanstalt, 1933—"Die Lösungsgleichgewichte der Systeme der Salze ozeanischer Salzlagerungen," pages 159–164, Ackerbaum, Berlin).

In practice, however, deviations occur with respect to the equilibrium conditions predicted by said diagrams, primarily since restricted reaction times are employed and starting products, intermediates and final products are never very pure. Practical conditions for transforming kainite either to sulfate or to schoenite and sulfate are exemplified in Table I, as a function of the $K_2O$ percentage of the kainite itself as well as of the temperature of the conversion step.

TABLE I

| Kainite | | Conversion | | | | Leaching | | $K_2O$ in— | | | | Yield | |
|---|---|---|---|---|---|---|---|---|---|---|---|---|---|
| Percent $K_2O$ | G. | SML 40° C., cc. | ° C. | 21% Schoenite, g. | FML, g./l. $K_2O$ | Ml. | 21% Schoenite, g. | $K_2SO_4$ 50%, g. | Kainite | Excess Schoenite | Sulfate | FML | Overall | In $K_2SO_4$, g. |
| 17 | 500 | 500 | 23 | 555 | 29 | 500 | 383 | 69 | 85 | 36 | 34.5 | 14.5 | 83 | 40.5 |
| 17 | 800 | 1,130 | 25 | 950 | 29.5 | 1,805 | 880 | 80 | 136 | 14 | 90 | 32 | 76.5 | 66 |
| 17 | 500 | 750 | 23 | 628 | 30 | 732 | 604 | 116 | 85 | 5 | 58 | 22 | 74 | 68 |
| 17 | 1,000 | 1,580 | 25 | 1,235 | 32 | 1,500 | 1,235 | 244 | 170 | 0 | 122 | 48 | 71.8 | 71.8 |
| 17 | 500 | 500 | 40 | 540 | 34 | 529 | 335 | 70 | 85 | 32 | 35 | 18 | 78.9 | 41.2 |
| 17 | 375 | 450 | 40 | 435 | 38 | 400 | 350 | 64 | 63.7 | 16.5 | 32 | 15.2 | 76.2 | 50.2 |
| 17 | 500 | 750 | 40 | 595 | 38 | 750 | 595 | 113 | 85 | 0 | 56.5 | 23.5 | 66.5 | 66.5 |
| 17 | 285 | 450 | 40 | 350 | 42 | 400 | 350 | 63.4 | 48.5 | 0 | 31.7 | 16.8 | 65.5 | 65.5 |
| 16 | 347 | 400 | 25 | 390 | 30.9 | 350 | 310 | 56.4 | 55.5 | 16.5 | 28.2 | 10.8 | 80.5 | 51 |
| 16 | 256 | 400 | 25 | 315 | 31.5 | 385 | 315 | 57.8 | 41 | 0 | 28.9 | 12.1 | 70.5 | 70.5 |
| 16 | 347 | 400 | 35 | 377 | 34 | 392 | 310 | 56.4 | 55.5 | 14 | 28.2 | 13.2 | 76.1 | 51 |
| 16 | 300 | 390 | 35 | 338 | 35.5 | 370 | 305 | 56 | 48 | 6.9 | 28 | 13.1 | 72.8 | 58.3 |
| 15 | 275 | 400 | 25 | 306 | 36 | 384 | 306 | 54.8 | 41.2 | 0 | 27.4 | 13.8 | 66.5 | 66.5 |
| 15 | 347 | 450 | 40 | 362 | 43 | 409 | 355 | 66 | 52 | 1.4 | 33 | 17.6 | 66.1 | 63.5 |
| 15 | 320 | 450 | 40 | 340 | 44 | 410 | 340 | 60 | 48 | 0 | 30 | 18 | 62.5 | 62.5 |

In the "Leaching" column the schoenite amount indicated is that necessary and sufficient to restore the volume of SML at 48° C. employed in each operation. It is observed that:

(1) The yield of $K_2SO_4$ or $K_2SO_4$+schoenite increases when the conversion temperature and the kainite titer decrease;

(2) Maintaining a constant temperature and titer, the lower overall yield occurs in the case where sulfate only is produced, said yield being in the order of 71 to 72% in the most favorable case (17% kainite, conversion at 25° C.);

(3) In contrast thereto, the highest overall yield occurs in correspondence with the lowest production ratio $$\frac{\text{sulfate } K_2O}{\text{schoenite } K_2O}$$

An easy way for also transforming the $K_2O$ contained in the excess portion of schoenite to $K_2SO_4$ is to dissolve said schoenite in water and precipitate the potassium therefrom as the syngenite $K_2SO_4 \cdot CaSO_4 \cdot H_2O$ (or pentasulfate $K_2SO_4 \cdot 5CaSO_4 \cdot H_2O$), while subsequently recovering the potassium as a dilute solution of $K_2SO_4$ by washing said syngenite (or pentasulfate) with the required amount of water, at about 50° C., in the leaching step of schoenite in the normal cycle.

Even this expedient, however, does not substantially increase the overall yield of transformation to $K_2SO_4$, inasmuch as a further loss of $K_2O$ occurs, said loss being represented by the equilibrium solution with syngenite, which contains about 25 g./l. $K_2O$ and becomes a process waste.

We have found, and this is an object of our invention, that the schoenite obtained in excess to that required for the cycle conversion—leaching, is apt to react in the solid phase with the calcium sulfate, to give syngenite and/or pentasulfate, in the same mother liquor (FML) with which said schoenite is in equilibrium at the end of conversion operation (a) (see column 1).

Furthermore, we have found that, within practical limits of reaction times, by employing relatively high working temperatures, e.g. 35–40° C., solutions more impoverished in $K_2O$ are obtained, which are in equilibrium with the syngenitic crystal phase practically free from schoenite.

This means that the calcium-potassium double sulfate formation rate increases with the temperature faster than the potassium equilibrium concentration of the liquid phase, whereby within practical contact times, i.e. 2–3 hours, the results obtained are markedly in contrast to those to be theoretically expected, i.e., equilibrium solutions enriched with $K_2O$ are obtained over very long reaction times as the temperature gradually increases.

Besides solid schoenite, the FML itself also takes part in the precipitation of Ca—K double sulfate when said FML, as a rule, shows a $K_2O$ content greater than the admissible limit in the presence of a syngenitic crystal phase.

A $K_2O$ recovery, therefore, occurs which is greater than that corresponding to the solid schoenite. The realizable overall recovery is limited, in absolute amount, by the fact that the potassium precipitated with $CaSO_4$ has to be recycled, in the leaching step (b), as a dilute solution of $K_2SO_4$ obtained by warm washing (50–70° C.) of a syngenite, while employing only the water volume required from the normal step (b) of the leaching operation and taking in account the fact that within said temperature range the syngenite washing leads to solutions having about 30 g./l. $K_2O$ as $K_2SO_4$.

According to the present invention, the process of transformation of kainite to potassium sulfate exclusively comprises the following steps:

(a) Conversion, at 35–40° C., of kainite with the SML (see the next step) and obtainment of schoenite and relating mother liquor (FML);

(b) Leaching at 48° C. of a portion of the schoenite produced as in (a), by means of the weak $K_2SO_4$ solution, coming from (d). Solid $K_2SO_4$ is obtained, and SML which is employed in (a);

(c) Treatment with $CaSO_4$ of a suspension constituted of the FML obtained as in (a) and of the schoenite not employed in (b), in the presence of seed crystals of syngenite in order to speed the Ca—K double sulfate precipitation. In this step the waste solution of the process is obtained, which shows a lowest $K_2O$ content (about 27 g./l.) at relatively high temperatures (35–40° C.);

(d) Washing of the syngenite obtained as in (c) with the hot water required by the step (b). In this way solid $CaSO_4$ is obtained, which may be recycled, and a solution with about 50 g./l. $K_2SO_4$ and 2 g./l. $CaSO_4$ which is employed in (b). The absolute amount of $K_2SO_4$ so introduced in the step (b) is completely reprecipitated, while augmenting the $K_2SO_4$ obtained from the normal leaching of schoenite. The small percentage of $CaSO_4$ exerts no influence on the leaching course.

The advantages of the above-described process, in comparison with the known process of conversion-leaching, consist among others in:

(1) A higher transformation yield of kainite to potassium sulfate;

(2) Higher thermal levels in the conversion step (35–40° C. rather than 25° C.), hence lower cooling costs for the SML which is always obtained at the optimum temperature of 48° C.;

(3) Maintaining satisfactory transformation yields even when employing kainites with a titer less than 17%;

(4) Operating on smaller masses per unit of transformed kainite, since a lower ratio of attack $$\frac{SML}{kainite}$$

occurs in comparison with the normal cycle;

(5) Increased concentration of $MgSO_4$ in the FML to the theoretical saturation, owing to the effect of the reaction:

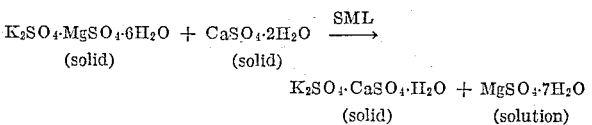

This involves a greater yield of crystallized salt per unit volume when the FML are cooled for obtaining bitter salt ($MgSO_4$), which is a valuable by-product of potassium processing.

Examples of kainite treatment, according to the principles of this invention, for the production of potassium sulfate are hereinafter described to illustrate the invention but not to limit the scope thereof.

*Example 1*

1000 g. of kainite with 17% $K_2O$ are converted at 40° C. to schoenite, by contact under stirring for 2 hours with 1330 ml. of a solution (SML) containing 92 g./l. $K_2O$ coming from the leaching step at 48° C. 1320 ml. of equilibrium solution at 40° C. (FML) and 1095 g. of schoenite, with 38.9 g./l. and 22% $K_2O$, respectively, are obtained. 50 g. of said schoenite are suspended in the whole volume of FML, 55 g. $CaSO_4 \cdot 2H_2O$ and 50 g. of preformed seed crystals of syngenite with 18.5% $K_2O$ are added (in order to hasten the precipitation), while stirring for two hours at 40° C. By filtration and washing of the solid phase with about 50 ml. water, 1340 ml. of a solution to be discarded with 26.3 g./l. $K_2O$ are obtained, as well as 195 g. of a crystal phase, composed of syngenite practically free of schoenite, with 18.5% $K_2O$. 50 g. of this syngenite are utilized for seeding a subsequent operation and the remainder is contacted with 935 ml. of water at about 70° C., to obtain a $K_2SO_4$ solution with 29 g./l. $K_2O$ and a residue of calcium sulfate which may be recycled to a subsequent precipitation operation. Said solution is employed for leaching the remaining 1045 g. of schoenite; the temperature spontaneously rises to about the optimum value of 48° C., owing to the negative solution heat of schoenite and to the normal dispersions. From the leaching operation 1330 ml. SML with 92 g./l. $K_2O$ are obtained again, which are recycled, in equilibrium with a crystal phase formed of 293 g. $K_2SO_4$ slightly polluted with $MgSO_4$ and $CaSO_4$, less than 1% expressed as Mg, said substance unmodified having a $K_2O$ content of 46%. Therefore the kainite $K_2$ balance is the following:

Starting $K_2O$ _____ $(1000 \times 0.17) = 170$ g.
Discharge solution _____ $(1340 \times 0.263) = 35.4$ g.
Potassium sulfate _____ $(293 \times 0.46) = 134.6$ g.

with a transformation or conversion yield of $K_2SO_4$ of 79.2%.

Comparison of the above with the data of Table I, which shows that the highest attainable yield by conversion at 40° C. and for the transformation to the only sulfate is 66.5% according to the normal cycle, and the absolute maximum is obtained when performing the conversion at 25° C., while attaining a 71.8% yield, however under the more burdensome condition of cooling to 25° C. a larger SML volume (1580 ml. against the 1330 ml. of this example), the treated kainite amounts being equal, shows the advantages of the instant process.

*Example 2*

1000 g. kainite with 16% $K_2O$ (namely

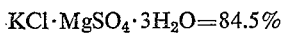

the balance being essentially NaCl) are converted during two hours while stirring at 35° C., with 1280 ml. SML containing 92 g./l. $K_2O$, coming from the leaching step. 1280 ml. of equilibrium solution (FML) at 35° C., are obtained, with 36 g./l. $K_2O$, and 1053 g. schoenite with 22% $K_2O$. 63 g. of said schoenite are left in suspension in the FML and this suspension is made to react, for two hours at 35° C., together with 50 g. of $CaSO_4 \cdot 2H_2O$ in the presence of 50 g. syngenite in order to hasten the reaction. By filtration and washing, as in the preceding example, 1290 ml. of a solution to be discarded with 27.2 g./l. $K_2O$, and a crystal phase formed of syngenite practically free of schoenite are obtained; after separation of an amount of syngenite corresponding to that employed for seeding, said substance is treated with water at about 70° C., to obtain 895 ml. of solution with 27.7 g./l. $K_2O$, constituted essentially of $K_2SO_4$, and calcium sulfate which is separated by filtration. With said 895 ml. of solution, the remaining 990 g. schoenite are leached at 48° C., to obtain the 1280 ml. SML wherewith the cycle is restarted, and 271 g. of wet $K_2SO_4$ with 46% $K_2O$. Accordingly, 124.9 g. of $K_2O$ transformed to sulfate are obtained as well as 35.1 g. $K_2O$ in the discarded solution (together 160 g., corresponding to the $K_2O$ introduced with the kainite), with a 78% yield.

The comparison with the data of Table I shows the advantages offered by the herein-disclosed process, either in regard of the conversion yield or for the lesser requirement of calories and frigories, the amounts of treated kainite being equal.

*Example 3*

1000 g. kainite with 15% $K_2O$ (the main impurity being NaCl) are converted, by stirring for 3 hours at 40° C., by means of 1250 ml. SML with 92 g./l. $K_2O$ coming from the leaching step 1230 ml. of equilibrium solution (FML) at 40° C. with 41 g./l. $K_2O$ are obtained, as well as 1000 g. schoenite with 21.46% $K_2O$. 46 g. of this schoenite, suspended in the same FML, are reacted, at 40° C., with 55 g. $CaSO_4 \cdot 2H_2O$, in the presence of 50 g. syngenite crystals, for 2 hours. The syngenite precipitate is filtered and washed, to obtain 1250 ml. of solution to be discarded with 27 g./l. $K_2O$ as well as a crystal phase constituted of syngenite practically free of schoenite, with 18.3% $K_2O$. The portion corresponding to the previously employed seed syngenite is separated from said substance, and the remainder is treated with warm water, to obtain calcium sulfate and 885 ml. solution with 30 g./l. $K_2O$ as $K_2SO_4$, with which the leaching at 48° C. of the remaining 954 g. of schoenite is performed, wherefrom 1250 ml. SML with 92 g./l. $K_2O$ and 252.5 g. $K_2SO_4$ with 46% $K_2O$, originate. Therefore the transformation yield is:

$$\frac{252.5 \times 0.46}{150} = 77.4$$

which is distinctly higher than the 62.5% yield attainable through the normal cycle with conversion at 40° C., as it appears in Table I.

*Example 4*

1000 g. schoenite with 21.5% $K_2O$ are suspended in 1000 ml. FML with 40 g./l. $K_2O$ and are stirred for 2 hours at 30° C. after addition of 60 g. syngenite with 20% $K_2O$ and 90 g. $CaSO_4 \cdot 2H_2O$. The solid phase is filtered and washed with about 40 ml. cold water to obtain 260 g. of salt with 16% $K_2O$ and 1020 ml. of solution with 31.4 g./l. $K_2O$ and 59.6 g./l. Mg. About 12% by weight of said salt contains unreacted schoenite; which by dissolution in warm water forms a $K_2SO_4$ solution containing also the magnesium sulfate of said schoenite residue. Since said solution, according to the present process, is employed for leaching schoenite at 48° C., it is apparent that less schoenite may be leached therewith than would be possible when the leaching solution would be practically free of $MgSO_4$, while always obtaining, at the end of leaching, a solution (SML) of practical equilibrium with not more than 44–45 g./l. Mg as $MgSO_4$.

*Example 5*

1000 g. schoenite with 21.5% $K_2O$ are suspended in 1000 ml. FML with 40 g./l. $K_2O$ and are stirred for 2 hours at 40° C. after addition of 60 g. syngenite with 20% $K_2O$ and 90 g. $CaSO_4 \cdot 2H_2O$. It is filtered and washed with 40 ml. cold water, to obtain 1020 ml. of solution with 27.5 g./l. $K_2O$ and 61.7 g./l. Mg, as well as 264 g. of syngenite with 17.2% $K_2O$, which is practically free of schoenite and thus is apt to afford a water solution wherein the solute is substantially made up of $K_2SO_4$, according to the requirements of this process. By comparison with Example 4 it is thus deduced that the temperature increase promotes the recovery, either quantitative or qualitative, of the schoenite fraction which is converted, in solid phase, to syngenite.

Moreover, more concentrated equilibrium solutions in $MgSO_4$ are obtained, and this results in a corresponding increase of precipitation yield of bitter salt, $MgSO_4$, the cooling temperatures being equal.

We claim:

1. A process for producing potassium sulfate from kainite which comprises the steps of:
   (a) converting kainite into schoenite with sulfate mother liquor recycled from step h at a temperature between 35° C. and 40° C. to produce an equilibrium solution and schoenite,
   (b) separating said equilibrium solution and schoenite,
   (c) suspending a portion of said schoenite in said equilibrium solution to produce a suspension,
   (d) adding calcium sulfate and syngenite seed crystals at a temperature between about 35° and 40° C. to form a syngenite precipitate,
   (e) separating off said syngenite precipitate,
   (f) dissolving said syngenite with the quantity of water, necessary to convert the remainder of said schoenite to potassium sulfate to produce a potassium sulfate solution containing solid calcium sulfate,
   (g) separating the calcium sulfate from the potassium sulfate solution,
   (h) leaching the remainder of said schoenite from step b with the separated potassium sulfate solution at 48° C., to obtain potassium sulfate and a sulfate mother liquor, and recycling the sulfate mother liquor to said step a.

2. A process for producing substantially pure potassium sulfate from kainite, which comprises the steps of:
   (a) converting the kainite with a recycled sulfate mother liquor (SML) from step b into schoenite $K_2SO_4 \cdot MgSO_4 \cdot 6H_2O$ and a final mother liquor (FML);
   (b) separating the schoenite from the final mother liquor (FML), leaching a portion of schoenite at a temperature of 48° C. with the potassium sulfate solution from step d to obtain solid potassium sulfate and a sulfate mother liquor (SML) which is recycled to step a;
   (c) reacting the remainder of said schoenite, suspended in the final mother liquor (FML), with gypsum $CaSO_4 \cdot 2H_2O$ from step d and syngenite seed crystals at a temperature from 30° to 40° C. to form a syngenite precipitate $K_2SO_4 \cdot CaSO_4 \cdot H_2O$, separating the syngenite so produced from the mother liquor, which is discarded;

(d) recycling a small portion of the produced syngenite to step c as seed crystals and leaching the remaining syngenite with hot water at a temperature between 50° and 70° C. to obtain solid gypsum, which is recycled to step c, and a potassium sulfate solution, which is recycled to step b.

3. A process according to claim 2, wherein the kainite has a content of $K_2O$ of at least 15%.

References Cited by the Examiner

UNITED STATES PATENTS 2,966,395  12/60  Carbotti _____ 23—121

MAURICE A. BRINDISI, *Primary Examiner.*